2,786
Patented Feb. 9, 1971

3,562,786
ORGANOSILICON-SURFACTANT COMPOSITIONS
Donald L. Bailey, Sistersville, W. Va., and Anton S. Pater, Williamsville, and Edward L. Morehouse, New City, N.Y., assignors to Union Carbide Corporation, a corporation of New York
No Drawing. Continuation-in-part of application Ser. No. 168,527, Jan. 24, 1962. This application Nov. 9, 1966, Ser. No. 592,998
Int. Cl. C11d 1/62, 3/20
U.S. Cl. 252—137          1 Claim

ABSTRACT OF THE DISCLOSURE

The disclosure deals with mixtures of cationic, nonionic, or amphoteric organic surfactants and additive amounts of siloxane-oxyalkylene block copolymers. The siloxane-oxyalkylene block copolymers are of the type wherein the two kinds of blocks are linked through an Si-C bond. The block copolymers serve to lower the surface tension of aqueous solutions of the organic surfactants thereby increasing the surface active properties of the organic surfactants, such as foaming, wetting, etc.

---

This application is a continuation-in-part application of U.S. Ser. No. 168,527, filed Jan. 24, 1962, now abandoned.

This invention relates to novel organosiliconpolyoxyalkylene organic surfactant composiitions useful in aqueous systems.

Surfactants, or surface-active agents, have been previously defined in the art as solutes which possess the property of altering the surface or interfacial characteristics of their solutions to an unusual extent.

It is an object of the present invention to improve the properties of water-soluble organic surfactants by the novel mixture of an organosiloxane-oxyalkylene block copolymer with an organic surfactant for use in aqueous systems. Preferably, the organosiloxane-oxyalkylene block copolymer must also be somewhat water-soluble or have an affinity for water in order to aid in the surfactant activity. A water insoluble organosiloxane-oxyalkylene block copolymer may be employed if it is at least partially soluble in the organic surfactant/water system. The block copolymers employed in this invention are especially useful because unlike most water-soluble organosilicon compounds, they do not hydrolyze upon standing in water solution. Undesirable by-product contamination is thus avoided and surfactant activity is maintained at highest effectiveness.

The surface tension of an aqueous solution of organic surfactant can be lowered to a marked extent and its surface active properties thereby appreciably increased when the organosiloxane-oxyalkylene block copolymer is present in an amount from 0.001 to 10 weight percent based on total weight of the aqueous solution. Preferably, the organosiloxane-oxyalkylene block copolymer is present in an amount from 0.01 to 1 weight percent based on total weight of the aqueous solution. The weight ratio of the organosiloxane-oxyalkylene block copolymer to organic surfactant is from 0.001/1 to 1/1 in the novel compositions of the present invention. Preferably, the weight ratio of organosiloxane-oxyalkylene block copolymer to organic surfactant is from 0.05/1 to 1/1.

The novel organosiloxane-oxyalkylene block copolymer organic surfactant mixture compositions of the present invention have utility, for example, as detergents, emulsifiers, foamers, wetting agents, dispersants, flocculants and penetrants. They are particularly useful in producing detergent foams of high stability and high foaming power in aqueous systems. Other specific uses involve foam stabilization and emulsification of water-organic solvent mixtures (such as, water-toluene). The use of organosilicon-oxyalkylene compounds to increase foaming power of a detergent is particularly novel and unobvious when compared to the prior use of organosilicon compounds as anti-foam agents in aqueous systems.

The mixture compositions of the present invention can be prepared in various ways. The organic surfactant and the organosiloxane-oxyalkylene block copolymer could first be mixed, and this mixture could be added to water whenever desired. An aqueous solution of the organic surfactant could alternatively be first prepared and then the block copolymer could be added to it. Still a further procedure would be to prepare an aqueous solution of block copolymer and then add the organic surfactant to it.

The organosiloxane-oxyalkylene copolymers useful in the compositions of this invention are of the class that are known as "block" copolymers. Block copolymers are composed of at least two sections or blocks, at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic, branched or crosslinked structures.

The siloxane blocks in the copolymers employed in the compositions of this invention contain at least two siloxane groups that are represented by the formula (1) 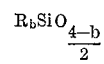

$$R_b SiO_{\frac{4-b}{2}}$$

wherein R is a monovalent hydrocarbon group, a halogen-substituted monovalent hydrocarbon group or a divalent hydrocarbon group and $b$ has a value from 1 to 3. Preferably, each R contains from one to about twenty carbon atoms. The groups represented by R can be the same or different in any given siloxane group or throughout the siloxane block, and the value of $b$ in the various siloxane groups in the siloxane block can be the same or different. Each siloxane block contains at least one group represented by Formula 1 wherein at least one group represented by R is a divalent hydrocarbon group. The divalent hydrocarbon group represented by R links the siloxane block to the oxyalkylene block. The siloxane block has a ratio of hydrocarbon groups to silicon atoms from 1:1 to 3:1.

Illustrative of the monovalent hydrocarbon groups that are represented by the R in Formula 1 are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl, and terphenyl groups); the aralkyl groups (for example, the benzyl and the phenylethyl groups); the alkaryl groups such as, the styryl, tolyl and n-hexylphenyl groups, and the cycloalkyl groups (for example, the cyclohexyl group).

Illustrative of the halogen-substituted monovalent hydrocarbon groups that are represented by R in Formula 1 are the chloromethyl, trichloroethyl, perfluorovinyl, parabromobenzyl, iodophenyl, alpha-chloro-beta-phenylethyl, parachlorotolyl, and bromocyclohexyl groups and the like.

Illustrative of the divalent hydrocarbon groups represented by R in Formula 1 are the alkylene groups (such as, the methylene, ethylene, propylene, butylene, 2,2-dimethyl-1,3-propylene, decylene and eicosylene groups), the arylene groups (such as the phenylene and p,p'-diphenylene groups), and the alkarylene groups (such as, the phenylethylene group). Preferably, the divalent hydrocarbon group is an alkylene group containing from two to four successive carbon atoms. Siloxane groups containing divalent groups as substituents are illustrated by groups having the formulas:

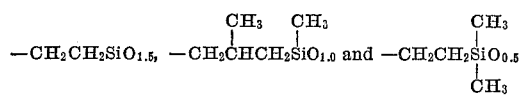

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane groups that are represented by Formula 1 wherein either the same hydrocarbon groups are attached to the silicon atom (e.g., the dimethylsiloxy, diphenylsiloxy and the diethylsiloxy groups) or different hydrocarbon groups are attached to the silicon atoms (e.g., the methylphenylsiloxy, phenylethylmethylsiloxy and ethylvinyl siloxy groups).

The siloxane block in the copolymers useful in the compositions of this invention can contain one or more types of siloxane groups that are represented by Formula 1 provided that at least one group has at least one divalent hydrocarbon substituent. By way of illustration, only ethylenemethylsiloxy groups

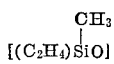

can be present in the siloxane block or the siloxane block can contain more than one type of siloxane group, e.g., the block can contain both ethylenemethylsiloxy groups and diphenylsiloxy groups, or the block can contain ethylenemethylsiloxy groups, diphenylsiloxy groups and diethylsiloxy groups.

The siloxane block contained in the copolymers useful in the compositions of this invention can contain trifunctional siloxane groups (e.g., monomethylsiloxane groups, $CH_3SiO_{1.5}$), difunctional siloxane groups (e.g., dimethylsiloxane groups $(CH_3)_2SiO$—), monofunctional siloxane groups (e.g., trimethylsiloxane groups, $(CH_3)_3SiO_{0.5}$), or combinations of these types of siloxane groups having the same or different substituents. Due to the functionality of the siloxane groups, the siloxane block can be predominately linear or cyclic or branched or it can have combinations of these structures.

The siloxane block contained in the copolymers useful in the compositions of this invention can contain organic end-blocking or chain terminating organic groups as well as the monofunctional siloxane chain terminating groups encompassed by Formula 1. By way of illustration, the siloxane block can contain such organic end-blocking groups as the hydroxyl group, the aryloxy groups (such as, the phenoxy group), the alkoxy groups (such as, the methoxy, ethoxy, propoxy and butoxy groups), the acyloxy groups (such as the acetoxy group), the the like.

The siloxane blocks in the copolymers useful in the compositions of this invention can contain at least two siloxane groups that are represented by Formula 1. Preferably, the siloxane blocks contain a total of at least five siloxane groups that are represented by Formula 1 and by Formula 1-a below. That part of the average molecular weight of the copolymer that is attributable to the siloxane blocks can be as high as 50,000 or greater.

A siloxane block can contain, in addition to the groups represented by Formula 1, one or more siloxane groups represented by the formula:

(1-a) 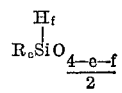

wherein R has the meaning defined in Formula 1, $e$ has a value from 0 to 2, $f$ has a value from 1 to 2 and $e+f$ has a value from 1 to 3.

The oxyalkylene blocks in the copolymers employed in the compositions of this invention each contain at least two oxyalkylene groups that are represented by the formula:

(2)   

wherein R' is an alkylene group. Preferably, the alkylene group represented by R' in Formula 2 contains from two to about ten carbon atoms, and most preferably from two to three carbon atoms. The copolymer must be at least partially soluble in the organic surfactant/water system. Water-solubility of the copolymer itself is enhanced when R' contains less than three carbon atoms. It is therefore important that at least one —$C_2H_4O$— group be present in the copolymer for it to be at least partially water-soluble.

The specific effect contributed by the polyoxyalkylene chain will vary with the type of oxyalkylene unit making up the chain. Thus, polysiloxane-polyoxyalkylene block copolymers in which the oxyalkylene units are composed of oxypropylene units are water-insoluble, whereas the molecules may be water-soluble when the oxyalkylene unit is oxyethylene, depending on the polysiloxane-polyoxyalkylene ratio. The polysiloxane - polyoxyalkylene block copolymers will vary in solubility from water-soluble to water-insoluble when the polyoxyalkylene chain is composed of both oxyethylene and oxypropylene units depending on their ratio and on the polysiloxane-polyoxyethylene ratio.

Illustrative of the oxyalkylene groups that are represented by Formula 2 are the oxyethylene, oxy-1,2-propylene, oxy-1,3-propylene, oxy-2,2 - dimethyl-1,3-propylene, oxy-1,10-decylene groups, and the like.

The oxyalkylene blocks in the copolymers useful in the compositions of this invention can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the copolymers useful in the compositions of this invention can contain organic end-blocking or chain terminating groups. By way of illustration, the oxyalkylene blocks can contain such end-blocking groups as the aryloxy group (such as, the phenoxy group), the alkoxy groups (such as, the methoxy, ethoxy, propoxy and butoxy groups), alkenyloxy groups (such as, the vinyloxy and the allyloxy groups). Also, a single group can serve as an end-blocking group for more than one oxyalkylene block. For example, the glyceroxy group,

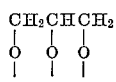

can serve as an end-blocking group for three oxyalkylene chains.

The oxyalkylene blocks in the copolymers useful in the compositions of this invention each contain at least two oxyalkylene groups that are represented by Formula 2. Preferably, each block contains at least 4 or 5 of such groups. That part of the average molecular weight of the copolymer that is attributable to the oxyalkylene blocks can vary from 88 for $(C_2H_4O)_2$ to 50,000 or greater.

The block copolymers useful in the compositions of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The block copolymers useful in the compositions of this invention can contain more than one of each of the blocks and the blocks can be arranged in various configurations such as linear, cyclic or branched configurations. By way of illustration, the following classes of compounds are among the siloxane-oxyalkylene block copolymers useful in the formulations of this invention.

(A) Copolymers that contain at least one unit that is represented by the formula:

(3) 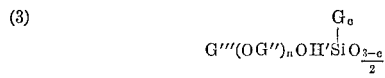

(B) Copolymers that contain at least one unit that is represented by the formula:

(4) 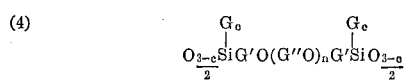

(C) Copolymers that contain at least one unit that is represented by the formula:

(5) 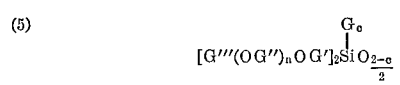

In the above Formulas 3, 4 and 5, G is a monovalent hydrocarbon radical or a halogen-substituted monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation, $n$ is an integer having a value of at least 2, and $c$ has a value from 0 to 2 in Formulas 3 and 4 and 0 to 1 in Formula 5. In Formulas 3, 4 and 5, G can represent the same or different radicals, $n$ preferably has a value from 2 or 4 to 30 and G'' can represent the same or different radicals, i.e., the group $(OG'')_n$ can represent, for example, the groups: $-(OC_2H_4)_p-$, $-(OC_2H_4)_p(OC_3H_6)_q-$, $-(OC_3H_6)_p-$ or $-(OC_2H_4)_p-(OC_8H_{16})_q-$, where $p$ and $q$ are integers having a value of at least one.

The monovalent hydrocarbon radicals and halogen-substituted monovalent hydrocarbon radicals represented by G in Formulas 3, 4 and 5 can be saturated or olefinically unsaturated or can contain benzenoid unsaturation.

Illustrative of the monovalent hydrocarbon radicals represented by G are the linear aliphatic radicals (e.g., the methyl, ethyl, decyl, octadecyl and eicosyl radicals), the cycloaliphatic radicals (e.g., the cyclohexyl and the cyclopentyl radicals), the aryl radicals (e.g., the phenyl, tolyl, xylyl, naphthyl and terphenyl radicals), the aralkyl radicals (e.g., the benzyl and betaphenylethyl radicals), the unsaturated linear aliphatic radicals (e.g., the vinyl, allyl and hexenyl radicals) and the unsaturated cycloaliphatic radicals (e.g., the cyclohexenyl radical).

Illustrative of the halogen-substituted monovalent hydrocarbon radicals represented by G are the chloromethyl, trichloroethyl, perfluorovinyl, para-bromobenzyl, iodophenyl, alpha-chloro-beta-phenylethyl, para-chlorotolyl and bromocyclohexyl groups and the like.

Preferably, the G and G' groups (included in the definition of R in Formulas 1 and 1–a above) contain from one to about twenty carbon atoms and the G'' groups (included in the definition of R' in Formula 2 above) contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 3, 4 and 5 are the alkylene radicals (e.g., the methylene, ethylene, 1,3-propylene, 1,4-butylene, 1,12-dodecylene and 1,20 eicosylene radicals), the arylene radicals (e.g., the phenylene radical) and the aralkylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G'' in Formulas 3, 4 and 5 are the ethylene, 1,2-propylene, 1,3-propylene, 1,6-hexylene, 2-ethylhexylene-1,6 and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert.-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and betaphenylethyl radicals).

The following are representative of the hydrolytically stable siloxane-oxyalkylene block copolymers useful in the compositions of this invention. In the formulas throughout this specification, Me represents methyl ($CH_3$), Et represents ethyl ($CH_3CH_2$), $\phi$ represents phenyl ($C_6H_5$), Bu represents n-butyl ($CH_3CH_2CH_2CH_2$) and $x$ is an integer.

(a) 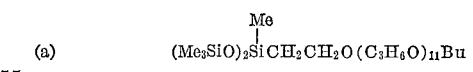

Organosiloxane-oxyalkylene block copolymers which are especially useful in compositions of the present invention have the following average formulas:

(b) $Me_3Si(OSiMe_2)_6[OMeSiCH_2CH_2CH_2O$
$(C_2H_4O)_8Me]_7OSiMe_3$
Molecular weight of about 3600

(c) $Me_3Si(OSiMe_2)_{19}[OMeSiCH_2CH_2CH_2O$
$(C_2H_4O)_{19}(C_3H_6O)_{14}Bu]_3OSiMe_3$
Molecular weight of about 7000

(d) $Me_3Si(OSiMe_2)_7[OMeSiCH_2CH_2CH_2O$
$(C_2H_4O)_{15}Me]_3OSiMe_3$
Molecular weight of about 3100

(e) $Me_3Si(OSiMe_2)_5[OMeSiCH_2CH_2CH_2O$
$(C_2H_4O)_8Me]_7OSiMe_3$ (f) $Me_3Si(OSiMe_2)_{20}[OMeSiCH_2CH_2CH_2O$
$(C_2H_4O)_{19}(C_3H_6O)_{14}Bu]_{3.2}OSiMe_3$ (g) $Me_3Si(OSiMe_2)_{13}[OMeSiCH_2CH_2CH_2O$
$(C_2H_4O)_{15}Me]_{5.5}OSiMe_3$ (h) $Me_3SiO[MeO(C_2H_4O)_7C_3H_6SiMeO]SiMe_3$

The siloxane-oxyalkylene block copolymers useful in the compositions of this invention can be prepared by several convenient methods. For example, the copolymers useful in this invention can be produced by a process that involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer. This process is referred to herein as the "metathesis process" and it involves a metathesis reaction that can be illustrated by the following equation:

(6)
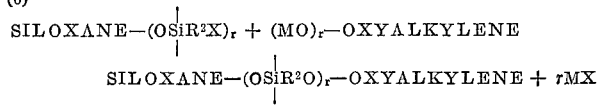

wherein $R^2$ is a divalent hydrocarbon group, $r$ is an integer that has a value of at least 1 and preferably 1 to about 4, X is a halogen atom, M is an alkali metal, SILOXANE denotes a siloxane block and OXYALKYLENE denotes an oxyalkylene block.

The copolymers useful in this invention can also be produced by another process (termed the "addition process") that involves forming a mixture of a siloxane polymer containing a hydrogen-siloxy group (i.e., a HSiO-group)

an oxyalkylene polymer containing an alkenyloxy endblocking or chain terminating group and a platinum catalyst and heating the mixture to a temperature sufficiently elevated to cause the siloxane polymer and the oxyalkylene polymer to react to produce the copolymer. The latter-mentioned reaction is an addition reaction that can be illustrated by the following equation:

(9)
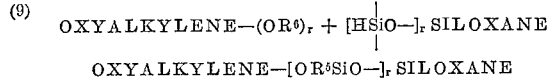

wherein OXYALKYLENE, SILOXANE and $r$ have the meaning defined for Formula 6, $OR^6$ is an alkenyloxy group (such as, the vinyloxy and the allyloxy groups) and $R^5$ is an alkylene group containing at least two successive carbon atoms. The addition process is applicable to the production of those copolymers of this invention containing a siloxane block that is linked to an oxyalkylene block by an alkylene group that has at least two successive carbon atoms (e.g., an ethylene, 1,2-propylene or 1,2-butylene group and the like).

When the polysiloxane-oxyalkylene block copolymer contains silicon-bonded hydrogen atoms, i.e., contains units represented by Formula 1–a described above, the addition process is preferable. If the metathesis process is used, many of the silicon-bonded hydrogen atoms will react with the alkali metal ions present in the reaction mixture.

When the copolymers useful in this invention contain olefinically unsaturated groups attached to silicon (for example, when R in Formula 1 or 1–a above is alkenyl or cycloalkenyl, such as vinyl or cyclohexenyl) it is preferable to prepare these copolymers by addition of the alkenyloxy-end-blocked oxyalkylene polymer to a monomeric, hydrolyzable silane containing silicon-bonded hydrogen, followed by co-hydrolysis or co-condensation with other hydrolyzable silanes containing silicon-bonded hydrogen and silicon-bonded olefinically unsaturated hydrocarbon groups using conventional techniques known to those versed in the art. For example, reaction of

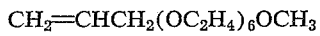

with $CH_3SiHCl_2$ in the presence of a platinum catalyst followed by cohydrolysis of the product with

$CH_3SiHCl_2$, and $(CH_3)_3SiCl$ gives a copolymer useful in this invention containing units having the formulas

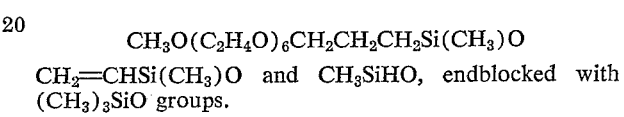

$CH_2{=}CHSi(CH_3)O$ and $CH_3SiHO$, endblocked with $(CH_3)_3SiO$ groups.

Water-soluble surfactants or surface active agents which do not contain silicon and which are useful in the compositions of this invention can be conveniently classified as synthetic, silicon-free anionic, cationic, nonionic and amphoteric. These surface active agents are generally characterized structurally by an elongated non-polar portion having but little affinity for water or water-soluble systems and a short polar portion possessing high affinity for water and water-soluble systems. The non-polar portion is hydrophobic and the polar portion is hydrophilic.

If the elongated, non-polar portion of the molecule is included in the anion in the aqueous solution, the surfactant is called *anionic*. Sodium stearate is a typical anionic surface active agent which ionizes in water to form a sodium cation and the long-chain stearate anion which appears to be responsible for the surface activity. In the anionic class, the most commercially important anion groups are carboxy (—COOH), sulfonic acid (—SO₃H) and sulfuric ester (—OSO₃H).

The *cationic* or cation active surfactants ionize in water to form a *cation* containing the elongated non-polar portion. Cetylpyridinium chloride is an example. In the cationic class the most prevalent groups are primary, secondary and tertiary amino groups and the quaternary ammonium groups. Phosphonium and sulfonium groups are occasionally used.

The nonionic surface active agents do not dissociate in water but nevertheless are characterized by a relatively polar portion and a relatively non-polar portion. An example is N-(beta-hydroxyethyl)laurylamide.

The amphoteric surface active agents from zwitterions in water wherein a rearrangement occurs within the molecule so that the same molecule can act as either an anionic or a cationic surfactant. Cetylaminoacetic acid is an example.

In the majority of surfactants useful in this invention, the long-chain non-polar portion of the molecule is derived from a straight-chain saturated hydrocarbon having from about 8 to about 24 carbon atoms. Generally, this long-chain portion is also a mixture of homologous radicals rather than a clearly defined individual radical. Thus, the molecule will generally contain a mixture of compounds ranging from $C_8$ to $C_{24}$ but especially rich in the hydrocarbons for which the compound is named. The "lauryl" surfactants thus would be rich in $C_{12}$ chains.

Illustrative examples of water-soluble surfactants useful in the compositions of the present invention are as follows.

Anionic surfactants can be carboxylic acids, such as, $C_8$–$C_{24}$ straight-chain saturated acids, oleyloxamic acid, N-dodecyl-N-hexylphthalamic acid; alkali metal salts of $C_8$–$C_{24}$ straight-chain saturated carboxylic acids, such as, sodium stearate, sodium laurate; alkali metal salts of oleic acid, such as, sodium oleate; alkane sulfonic acids and alkyl aromatic sulfonic acids, such as, dodecylbenzene sulfonic acid; substituted esters of alkane sulfonic acids, such as, disodium-N-octadecyl-sulfosuccinimate, tetrasodium-N-(1,2-dicarboxyethyl)-N-octadecylsulfosuccinate, diamyl ester of sodium sulfosuccinic acid, dihexyl ester of sodium sulfosuccinic acid, dioctyl ester of sodium sulfosuccinic acid, bis(tridecyl)ester of sodium sulfosuccinic acid, isopropyl naphthalene sodium sulfonate, dodecylbenzene sodium sulfonate, sodium dodecyldiphenyl oxide disulfonate, sodium dodecyl naphthalene sulfonate, ammonium tridecyl benzene sulfonate, amidomethylphenyl sulfonate, triethanolamine dodecylbenzene sulfonate, sodium lauryl sulfoacetate; alkali metal salts of substituted carboxylic acids, such as, sodium N-methyl-N-oleyl taurate, sodium lauroyl isothionate, sodium N-cyclohexyl-N-palmitoyl taurate, sodium N-methyl-N-palmitoyl taurate; sulfuric esters, such as, sodium tetradecyl sulfate, ammonium lauryl sulfate, diethanolamine lauryl sulfate, magnesium lauryl sulfate, potassium lauryl sulfate, triethanolamine lauryl sulfate, sodium lauryl sulfate, sodium lauryl ether sulfate, ammonium lauryl ether sulfate, triethanolamine ammonium lauryl sulfate, sodium 2-ethylhexanol sulfate, sodium cetyl sulfate, ammonium nonylphenol polyglycol ether sulfate, sodium oleyl sulfate, ammonium nonylphenoltetraethoxy sulfate, sodium nonylphenoltetraethoxy sulfate, triethanolamine nonylphenoltetraethoxy sulfate, monoethanolamine lauryl ether sulfate, magnesium lauryl ether sulfate; and polyethylene glycol dodecylthioether.

Cationic surfactants useful in the present invention can be amine salts, such as, dodecyl dimethyl amine acetate, cetyl dimethyl amine oxide, cetyl pyridinium chloride, stearyl dimethyl benzyl ammonium chloride, lauryl pyridium chloride; heterocyclic amines, such as, N-cetyl-piperidine and N-stearylpiperidine; and sulfated cresylic acid.

Illustrative of nonionic surfactants are derivatives of fatty alcohols, such as, acetylated lanolin alcohols, nonylphenoxy poly(ethyleneoxy)ethanol, octylphenoxy-poly(ethyleneoxy)ethanol, nonylphenolpolyglycol ether alcohol, octylphenolpolyglycol ether alcohol, sorbitan monooleate, polyoxyethylene sorbitan tristearate; and amine derivatives of fatty carboxylic acids, such as, lauric acid monoethanolamide, lauric acid isopropanolamide, lauric acid diethanolamide, myristic diethanolamide; and polyethylene glycol tert-dodecyl thioether.

Amphoteric surfactants can be sodium N-coco beta-aminopropionate, disodium N-tallow beta-aminodipropionate, N-lauryl beta-aminopropionic acid, cetyl betaine, cetylaminoacetic acid, sodium N-methyltaurate, and ethylene cycloimido-1-lauryl-2-hydroxy-2-ethylene sodium alcoholate-2-methylene sodium carboxylate.

It should be noted that mixtures of organic surfactants can also be used in compositions of the present invention in order to achieve desired results.

It is known in the surfactant art, and especially in the detergent art, that additives called "builders" can be employed to increase the surfactant activity. In the case of detergents, the builders promote the detergent action and aid in solubility. Such builders can also be employed in compositions of the present invention. Inorganic materials, such as, alkali metal carbonates, phosphates, borates and silicates, are useful as builders. Such builders are quite useful with the sulfonic acid and sulfuric ester detergents and even with some of the nonionic types. Neutral reacting inorganic salts, such as, sodium sulfate and sodium chloride, also act as builders with these detergents. Organic builders can also be employed. Illustrative examples are water-soluble, high-polymeric gums, starches, and proteins. The sodium salt of carboxymethylcellulose, methylcellulose, hydroxymethylcellulose, sodium polyacrylate, urea, thiourea, sodium citrate, sodium lactate, fatty acid amides and alkylol amides, fatty acid nitriles and morpholides can also be used.

The effects of the novel organosiloxane-oxyalkylene block copolymer-organic surfactant compositions upon the surface tension and foaming properties of aqueous solutions are shown in the following examples.

EXAMPLE 1

Aqueous solutions containing 1% by weight of sodium lauryl sulfate modified with different amounts of an organosiloxane - oxyalkylene block copolymer having the average formula

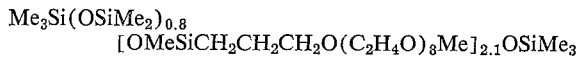

were prepared. Aliquot proportions (50 ml.) of these solutions were diluted in 500 ml. graduated flasks to reduce the solution concentration by a factor of 10. This procedure was repeated using the weak solutions to obtain concentrations as low as 0.001% by weight. The surface tension of each solution was measured using the Du Nouy Ring Method as described in ASTM D1331–54–T. The solutions were agitated and foam heights were measured at room temperature with the Ross Miles foam apparatus. This apparatus and method are described in detail in "Tergitol Surfactants" pages 30–31, published by Union Carbide Chemicals Company.

The results of these tests are shown in the following table:

TABLE I

| Surfactant mixture (parts by wt.) | | Concentration of surfactant mixture (wt. percent) | | | | Concentration of surfactant mixture (wt. percent) | | | | | | | |
|---|---|---|---|---|---|---|---|---|---|---|---|---|---|
| | | Surface tension in dynes/cm. at 25° C. | | | | Foam height in mm. at 27° C. | | | | | | | |
| | | | | | | 1 | | 0.1 | | 0.01 | | 0.001 | |
| Organic | Silicone | 1 | 0.1 | 0.01 | 0.001 | B[1] | A[2] | B | A | B | A | B | A |
| 10 | 0 | 33.6 | 33.7 | 42.3 | 68.5 | 170 | 168 | 130 | 125 | 10 | 5 | 1 | -- |
| 9 | 1 | 33.0 | 29.7 | 35.5 | 54.9 | 183 | 183 | 155 | 150 | 5 | 1 | -- | -- |
| 3 | 1 | 31.3 | 31.6 | 32.2 | 50.1 | 185 | 185 | 155 | 147 | 20 | 7 | 14 | 3 |
| 1 | 1 | 29.5 | 29.3 | 31.2 | 48.5 | 167 | 163 | 147 | 138 | 56 | 48 | 15 | 10 |
| 0 | 10 | 25.3 | 24.4 | 28.5 | 40.2 | 141 | 125 | 85 | 75 | 43 | 36 | 19 | 14 |

[1] Original foam height.
[2] Foam height after standing for 5 minutes.

It can be seen from the above table that the surface tension of the solution is desirably reduced as the organosiloxane-oxyalkylene block copolymer content increases. This becomes more pronounced at silicone surfactant/organic surfactant mixture concentrations less than 0.1 wt. percent. This in turn appreciably aids both the original foam height and also the stability of the foam upon standing when the solution is employed in foaming applications.

It can further be seen from the table that in the majority of cases the foam height and foam stability are substantially aided by the combination of organic surfactant and organosiloxane-oxyalkylene block copolymer according to the teaching of the present invention. Neither material alone will generally produce the desired results achieved by the novel combination.

EXAMPLE 2

The procedure used in this example was similar to that employed in Example 1. The results of this example are shown in the following tables:

TABLE II.—PROPERTIES OF ORGANIC SURFACTANTS WITH A SILICONE SURFACANT

| Surfactants | Percent concentration | | | | Percent concentration | | | | | | | |
|---|---|---|---|---|---|---|---|---|---|---|---|---|
| | | | | | 1 | | 0.1 | | 0.01 | | 0.001 | |
| | | | | | Ross-Miles foam height in mm. at room temperature (24–28° C.) | | | | | | | |
| | 1 | 0.1 | 0.01 | 0.001 | Initial | After 5 mins. | Initial | After 5 mins. | Initial | After 5 mins. | Initial | After 5 mins. |
| | Surface tension [1] at 25° C. dynes/cm. | | | | | | | | | | | |
| Nonyl phenol polyethylene glycol ether | 33.7 | 33.7 | 33.4 | 43.8 | 187 | 170 | 118 | 118 | 58 | 57 | 23 | 20 |
| Sodium tetradecyl sulfate | 31.2 | 41.3 | 55.8 | | 182 | 100 | 140 | 1 | 35 | 1 | | |
| Sodium lauryl sulfate | 33.6 | 33.7 | 42.3 | 68.5 | 170 | 168 | 130 | 125 | 10 | 5 | 1 | 0 |
| Sodium dodecyl sulfonate | 28.0 | 30.5 | 43.5 | 63.4 | 176 | 175 | 172 | 169 | 123 | 113 | 35 | 13 |
| Sodium di-octyl sulfosuccinate | 25.9 | 28.1 | 41.5 | 56.3 | 192 | 178 | 158 | 135 | 93 | 0 | 28 | 0 |
| Silicone surfactant [3] | 25.3 | 24.4 | 28.5 | 40.2 | 141 | 125 | 85 | 75 | 43 | 36 | 19 | 14 |
| 9 pts.[2] nonyl phenol polyethylene gycol ether/1 pt.[3] | 28.9 | 29.0 | 31.3 | 43.0 | 185 | 160 | 115 | 95 | 54 | 48 | 20 | 15 |
| 9 pts.[2] sodium tetradecyl sulfate/1 pt.[3] | 27.5 | 27.3 | 35.2 | 63.3 | 176 | 95 | 130 | 5 | 38 | 8 | 20 | 7 |
| 9 pts.[2] sodium lauryl sulfate/1 pt.[3] | 32.4 | 29.5 | 35.6 | 47.9 | 183 | 183 | 155 | 150 | 5 | 1 | | |
| 9 pts.[2] sodium dodecyl sulfonate/1 pt.[3] | 27.7 | 28.1 | 40.2 | 57.5 | 213 | 207 | 173 | 173 | 87 | 75 | 20 | 12 |
| 9 pts.[2] sodium di-octyl sulfosuccinate/1 pt.[3] | 26.7 | 25.8 | 40.4 | 55.1 | 193 | 180 | 165 | 145 | 79 | 50 | 22 | 14 |

[1] Surface tension measurements were determined by using a Du Nouy Tensiometer.
[2] Parts by weight.
[3] $Me_3SiO(Me_2SiO)_{0.8}[MeO(C_2H_4O)_{7.2}CH_2CH_2CH_2SiMeO]_{2.1}SiMe_3$.

It can be seen from the above table that in all instances the surface tension of the solution is desirably reduced as the organosiloxane-oxyalkylene block copolymer content increases. This effect is relatively more pronounced at silicone surfactant/organic mixture concentrations less than 0.1 weight percent.

In many instances foam heights were also higher for the solutions containing both silicone and organic surfactants than for the solutions containing only the organic surfactant. Results showing this phenomenon are underlined in the above table. Neither material alone will generally produce the desired results achieved by the combination.

It can be seen from the table below that in all instances the surface tension of the solution is desirably reduced as the organosiloxane-oxyalkylene block copolymer content increases. This effect is relatively more pronounced at silicone surfactant/organic mixture concentrations less than 0.1 weight percent.

In many instances foam heights were also higher for the solutions containing both silicone and organic surfactants than for the solutions containing only the organic surfactant. Results showing this phenomenon are underlined in the above table. Neither material alone will generally produce the desired results achieved by the combination.

TABLE IV.—SINGLE ADDITIVES IN SURFACE TENSION LOWERING OF AQUEOUS SURFACTANT SOLUTIONS

| | Composition of surfactant mixture | | Surfactant concentration | | |
|---|---|---|---|---|---|
| | | | 1.0% | 0.1% | 0.01% |
| Additive [1] | Parts by weight additive | Parts by weight sodium lauryl sulfate | Surface tension of aqueous solution dynes/cm. | | |
| | 0 | 10 | 32.7 | 31.9 | 44.5 |
| MM'CH₂OC₂H₅ | 1 | 9 | 29.0 | | |
| MM'CH₂O(EO)CH₃ | 1 | 9 | 27.4 | | |
| MM'(EO)₂CH₃ | 1 | 9 | 26.0 | 28.6 | 41.9 |
| MM'(EO)₂CH₃ | 2 | 9 | 24.0 | 26.9 | 41.2 |
| MM'(EO)₃CH₃ | 1 | 9 | 27.3 | | |
| MM'(EO)₅.₅CH₃ | 1 | 9 | 30.2 | | |
| MD'M(EO)₈.₂CH₃ | 1 | 9 | 29.6 | 26.9 | 25.0 |
| MD'M(EO)₈.₂CH₃ | 2 | 9 | 27.1 | 26.2 | 24.0 |
| MD'M(EO)₃CH₃ | 1 | 9 | 26.9 | | 26.9 |
| MD'M(EO)₄CH₃ | 1 | 9 | 28.2 | | 24.1 |
| MD₉M'(EO)₂CH₃ | 1 | 9 | 24.4 | (31.9) | 36.6 |
| MD₉M'(EO)₃CH₃ | 1 | 9 | 22.2 | | |
| MD₃M'(EO)₂CH₃ | 1 | 9 | 28.3 | | |
| MD3M'(EO)₈.₂CH₃ | 1 | 9 | 28.5 | | 28.2 |

[1] $M = Me_3SiO_{0.5}$; $M' = Me_2SiCH_2-$; $D = Me_2SiO-$; $D' = MeSiCH_2-$;

$EO = -C_2H_4O-$.
For example, "MD'M(EO)₅.₅CH₃" represents an additive having the formula:

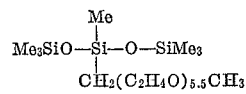

TABLE III.—PROPERTIES OF SODIUM LAURYL SULFATE WITH SILICONE SURFACTANT

| Surfactants | Percent concentration | | | | Percent concentration | | | | | | | |
|---|---|---|---|---|---|---|---|---|---|---|---|---|
| | | | | | 1 | | 0.1 | | 0.01 | | 0.001 | |
| | | | | | Ross-Miles foam height in mm. at room temperature (24–28° C.) | | | | | | | |
| | 1 | 0.1 | 0.01 | 0.001 | Initial | After 5 mins. | Initial | After 5 mins. | Initial | After 5 mins. | Initial | After 5 mins. |
| | Surface tension [1] at 25° C., dynes/cm. | | | | | | | | | | | |
| Sodium lauryl sulfate | 33.6 | 33.7 | 42.3 | 68.5 | 170 | 168 | 130 | 125 | 10 | 5 | 1 | 0 |
| 9 pts.[2] sodium lauryl sulfate/1 pt. silicone surfactant [3] | 33.6 | 31.8 | 38.4 | 50.8 | 170 | 170 | 158 | 155 | 20 | 8 | 0 | 0 |
| 6 pts.[2] sodium lauryl sulfate/1 pt. silicone surfactant [3] | 33.5 | 31.0 | 27.6 | 43.4 | 177 | 175 | 154 | 151 | 31 | 15 | 0 | 0 |
| 3 pts.[2] sodium lauryl sulfate/1 pt. silicone surfactant [3] | 28.7 | 27.1 | 25.2 | 35.9 | 162 | 159 | 147 | 143 | 55 | 30 | 13 | 5 |
| 1 pt.[2] sodium lauryl sulfate/1 pt. silicone surfactant [3] | 25.6 | 24.0 | 23.0 | 27.6 | 163 | 160 | 143 | 143 | 47 | 40 | 11 | 7 |
| Silicone surfactant [3] | 20.1 | 20.1 | 20.8 | 25.6 | 12 | 12 | 30 | 30 | 10 | 10 | 4 | 1 |

[1] Surface tension measurements were determined by using a DuNouy Tensiometer.
[2] Percent by weight.
[3] $Me_3SiO(Me_2SiO)_3SiMe_2CH_2(C_2H_4O)_{12.8}Me$.

It will be seen from Table IV that incorporation of a silicone surfactant desirably lowered the surface tension in all instances save one (result in parentheses), in which the surface tension remained the same as for the sodium lauryl sulfate solution containing no silicone surfactant.

TABLE V.—USE OF COMBINED ADDITIVES IN SURFACE TENSION LOWERING OF AQUEOUS SURFACTANT SOLUTIONS

| Major component | Parts by wt. | Parts by wt. MM'-(EO)$_2$CH$_3$.[1] | Parts by wt. MD'M-(EO)$_{3\text{-}2}$CH$_3$ [1] | Surfactant concentration | | |
|---|---|---|---|---|---|---|
| | | | | 1.0% | 0.1% | 0.01% |
| | | | | Surface tension of aqueous solution | | |
| Sodium lauryl sulfate | 10 | 0 | 0 | 32.7 | 31.9 | 44.5 |
| Do | 9 | 0.5 | 0.5 | 26.5 | 27.0 | 29.1 |
| Do | 9 | 0.25 | 0.75 | 27.4 | 27.2 | 28.3 |
| C$_9$H$_{19}$C$_6$H$_4$O(EO)$_{28}$H | 10 | 0 | 0 | 35.7 | 36.2 | 36.2 |
| Do | 9 | 0 | 0.5 | 25.3 | 27.2 | 31.6 |

[1] For meanings of symbols, see footnote to Table IV.

It will be seen from the above table that incorporation of a mixture of silicone surfactants appreciably lowered the surface tensions of both organic anionic (sodium lauryl sulfate) and organic nonionic $$(C_9H_{19}C_6H_4O(EO)_{28}H)$$

surfactant solutions.

EXAMPLE 3

Surface tension and foam power of several solutions were measured. The results are given in the following table.

Foam power was determined by putting 10 cc. of the solution to be tested in a 25 mm. x 250 cc. test tube, stoppering it and shaking it 20 times. Foam heights in mm. were observed then and again after five minutes. The average value for duplicate determinations is reported in the following table.

The surfactants used were as follows:

Armac T—An organic amine acetate cationic surfactant produced by Armour. It is 85% active.

Arquad T–50—An organic, alkyl quaternary ammonium chloride cationic surfactant produced by Armour. It is 50% active.

Tergitol TMN—An organic nonionic surfactant produced by Union Carbide Corporation. Its hydrophobe is trimethyl nonanol, and its hydrophil is 6 moles of ethylene oxide. It is 90% active.

Silicone—Me$_3$SiO[MeO(C$_2$H$_4$O)$_7$C$_3$H$_6$SiMeO]SiMe$_3$. It is 100% active.

The amounts of surfactants were adjusted to 100% active basis.

of the same magnitude as that achieved with the silicone additive.

The organosiloxane-oxyalkylene block copolymer-surfactant compositions of the present invention can be used as detergents and scouring agents in household and industrial cleaning applications, car washes, rug and hair shampoos, bubble baths, upholstery cleaners, cosmetics, bottle washers, dentrifices and shaving soaps. They can also be used to prepare foams useful to entrain air in concrete and cinder block mixes to provide concrete, cinder blocks and preformed concrete slabs having reduced densities. Foaming type flotation agents in metal ore separation and recovery systems is still another use. Further utility can be found as a dye assistant, textile dye leveler, or dye dispersant.

What is claimed is:

1. A composition suitable for use in reducing the surface tension of aqueous solutions, which composition consists essentially of (1) a synthetic, silicon-free, cationic surfactant having an amino group or a quaternary ammonium group as the polar portion of the molecule and a hydrocarbon group of about 8 to 24 carbon atoms as the nonpolar portion of the molecule, and (2) an organosiloxane-oxyalkylene block copolymer consisting essentially of from 1 to 7 units represented by the formula:

$$G'''(OG'')_nOG'SiO_{\frac{3-c}{2}}\overset{\overset{\displaystyle G_c}{|}}{\phantom{G'SiO}}$$

wherein G''' is an alkyl radical containing from 1 to 12 carbon atoms, G'' is an ethylene radical, G' is an alkylene radical containing from 1 to 20 carbon atoms, G is an alkyl radical containing from 1 to 20 carbon atoms, n is an integer having a value from 4 to 30 and c has a value from 0 to 2, and from 1 to 22 units represented by the formula:

$$R_bSiO_{\frac{4-b}{2}}$$

TABLE VI.—PROPERTIES OF SURFACTANT SOLUTIONS

| Surfactant mixture (gm. surfactant/100 g. H$_2$O for 1% dilution on active basis) | | | Concentration of surfactant mixture (wt. percent) | | | | Concentration of surfactant mixture (wt. percent) | | | | | | | | |
|---|---|---|---|---|---|---|---|---|---|---|---|---|---|---|---|
| | | | | | | | 1 | | 0.1 | | 0.01 | | 0.001 | | |
| Organic | Silicone | Tergitol TMN | Surface tension in dynes/cm. at 25° C.[1] | | | | Foam height in mm. at room temperature, after—(min.) | | | | | | | | |
| | | | 1 | 0.1 | 0.01 | 0.001 | 0 | 5 | 0 | 5 | 0 | 5 | 0 | 5 |
| [2] 1.18 | | | 29.3 | 29.5 | 34.1 | 40.6 | 45 | 31 | 30 | 23 | 4 | 1 | 0 | 0 |
| [2] 0.79 | 0.33 | | 27.8 | 29.1 | 30.8 | 38.4 | 44 | 27 | 25 | 20 | 5 | 3 | 0 | 0 |
| [3] 2.0 | | | 36.5 | 38.4 | 41.8 | 61.7 | 138 | 120 | 65 | 42 | 17 | 13 | 7 | 3 |
| [3] 1.34 | 0.33 | | 28.4 | 30.4 | 26.3 | 37.0 | 100 | 71 | 57 | 48 | 20 | 15 | 8 | 5 |
| [3] 1.34 | | 0.37 | 33.9 | 35.4 | 37.9 | 52.5 | 99 | 87 | 75 | 66 | 18 | 15 | 7 | 3 |
| | 1.0 | | 20.1 | 20.3 | 20.8 | 32.2 | 18 | 8 | 10 | 6 | 11 | 10 | 8 | 3 |
| | | 1.11 | 25.9 | 26.3 | 39.1 | 52.2 | 122 | 33 | 42 | 20 | 11 | 9 | 7 | 3 |

[1] Du Nuoy, average of 3 readings.
[2] Armac T.
[3] Arquad T-50.

It will be seen from the above table that incorporation of a silicone surfactant appreciably lowered the surface tensions of both organic cationic (Armac T and Arquad T–50) surfactant solutions. The substitution of an organic nonionic surfactant for the silicone nonionic surfactant in the silicone nonionic/organic cationic surfactant system did not result in surface tension lowering wherein R is an alkyl group containing from 1 to 20 carbon atoms and b has a value from 1 to 3, said copolymer containing from 5 parts by weight to 50 parts by weight of organosiloxane blocks and from 50 parts by weight to 95 parts by weight of oxyalkylene blocks per 100 parts by weight of the copolymer, the weight ratio of said organosiloxane-oxyalkylene block copolymer to said synthetic, silicon-free, cationic surfactant being from 0.05/1 to 1/1, said organosiloxane-oxyalkylene block copolymer being at least partially soluble in an aqueous solution of said cationic surfactant.

References Cited

UNITED STATES PATENTS 2,846,458  8/1958  Haluska.
2,991,300  7/1961  Schmidt et al.

OTHER REFERENCES

Sisley et al., Encyclopedia of Surface Active Agents, Chemical Pub. Co. Inc., New York (1952), p. 281.

LEON D. ROSDOL, Primary Examiner

M. HALPERN, Assistant Examiner

U.S. Cl. X.R.

252—89, 135, 138